United States Patent [19]

Bone

[11] Patent Number: 4,604,008
[45] Date of Patent: Aug. 5, 1986

[54] METAL WORKING MACHINE HAVING POLYGON TOOL SUPPORT BAR

[75] Inventor: Kendall F. Bone, Cincinnati, Ohio

[73] Assignee: Cincinnati Milacron Inc., Cincinnati, Ohio

[21] Appl. No.: 630,151

[22] Filed: Jul. 12, 1984

[51] Int. Cl.[4] .............................................. B23C 1/027
[52] U.S. Cl. .................................... 409/231; 409/232; 384/26
[58] Field of Search ................... 308/3 R; 74/342–346; 403/345, 383; 409/231–233; 408/22

[56] References Cited

U.S. PATENT DOCUMENTS 2,634,991 4/1953 Stevens ............................... 403/383
3,709,623 1/1973 Stephan et al. ........................ 408/22

FOREIGN PATENT DOCUMENTS 96381 12/1983 European Pat. Off. .

OTHER PUBLICATIONS

Brochure from Stoffel Polygon Systems, "Polygon Design Data", 1965.
Brochure from General Mold and Machinery Corporation, "Polygon Systems".
Brochure from Stoffel-Fortuna, "Fortuna Polygon Grinding Machines Model AFD . . . P."
*Tool and Manufacturing Engineers Handbook*, 3rd Edition (1976), New York: McGraw-Hill, p. 41–12.

Primary Examiner—Gil Weidenfeld
Assistant Examiner—Steven C. Bishop
Attorney, Agent, or Firm—Thomas M. Farrell

[57] ABSTRACT

Machine tools for cutting metal are provided having a polygon cross-sectional geometry self-centering, high torque transmitting, rotatable tool support bar that is movable along the longitudinal axis of the bar. The tool support bar is coupled to the drive mechanism for rotating the bar, at a point proximate to the exit of the bar from the machine, by a coupling having a slidably mating polygon geometry opening through which the bar passes. In an embodiment of the invention there is further provided means for releasably locking the tool support bar in a predetermined extended position.

5 Claims, 8 Drawing Figures

METAL WORKING MACHINE HAVING POLYGON TOOL SUPPORT BAR

FIELD OF INVENTION

This invention relates to metal working machines, i.e. machine tools, for cutting metal and more particularly to boring machines having a rotatable, extendable tool support bar for receiving and holding a metal cutting tool.

BACKGROUND

Boring machines have been known and used for over 60 years, during which time many improvements have been made on them. These machines are metal cutting machines known to be particularly suited to machine large openings, machine deep surfaces and machine blind surfaces in metal work pieces. They have also been employed to do more conventional machining, i.e. machining readily accessable surfaces. To perform the machining of large openings, and more particularly deep surfaces and blind surfaces, many of the boring machines of the prior art have a rotatable, extendable, cylindrical bar, i.e. boring bar, to support a cutting tool. In some cases the reach of the cutting tool into the workpiece may be many inches, e.g. 20 to 30 inches. The cutting tool is attached to the forward face of the bar, i.e. the face of the bar facing the workpiece, by several methods, e.g. by insertion of a tapered arbor into a mating tapered socket in the face of the boring bar and a draw bar to engage the arbor so as to seat and hold the tapered arbor in place. To rotate the cylindrical boring bar of the prior art machines the boring bar was coupled to gear and/or pulley and belt drive mechanisms by means of a key and keyway arrangement or by a spline. The keyway and spline configurations introduce stress rising points into the boring bar. These stress rising points concentrate stresses introduced into the bar by the torque created during cutting. Concentration of stress at these stress rising points often causes shear failure of the bar at or near the stress rising points. Thus, the cylindrical boring bar having a keyway or spline configuration coupling to a drive means is often weak at the coupling and subject to failure under torque. In machining surfaces deep within a metal workpiece the boring bar is extended from the boring machine toward the workpiece so that the cutting tool reaches the surface to be machined. Thus, extension of the boring bar from the machine in a cantilever fashion aggravates the stress failure problem of the cylindrical boring bar having a keyway or spline configuration for coupling to the drive means for rotating the bar. Not only do the keyway and spline coupling configuration in the cylindrical boring bar of prior art machines act as stress risers but they often also are points of fatigue failure, particularly when the bar is extended from the machine to perform a cutting operation deep within a metal workpiece.

In addition to boring bars having a circular cross-section, i.e. cylindrical boring bars, other shapes have been investigated including a circular cross-section modified by having two diametrically opposed flats and a bar having a body portion having a circular cross-section and at or near one end of the bar a polygon shaped cross-section. Additionally, purely and modified cylindrical bars have no way, by their geometry, of compensating for looseness between them and their mounts which must exist in order for slding to occur and which looseness will increase with time and wear. Accordingly cylindrical bars will rotate in a position excentric to their matching cylindrical supports when supporting radial forces.

SUMMARY OF THE INVENTION

It is an object of this invention to provide a metal working machine for cutting metal having a power driven rotatable, extensible tool supporting bar having a high torque transmission configuration and high resistance to shear forces under torque load.

Another object of this invention is to provide a metal working machine for cutting metal having a power driven high shear resistant, high torque transmission, rotatable, extensible tool supporting bar rotationally driven at or near the machine face from which the bar exits.

A further object of this invention is to provide a metal working machine for cutting metal having a power driven rotatable and extensible tool supporting bar of high stiffness at cantilevered extension from the machine.

These and other objects as will be apparent from the following description are accomplished in accordance with this invention wherein there is now provided a metal working machine for cutting metal comprising a base with a movable carrier mounted thereon holding a rotatable, axially movable tool supporting bar with a tool receiving face and a polygon cross-sectional geometry slidably coupled to a drive means for rotating the bar and coupled to a means for imparting axial movement (i.e. linear movement along the longitudinal axis) to the bar.

DETAILED DESCRIPTION OF THE INVENTION

The disadvantages and problems of the prior art are at least in great measure overcome by this invention wherein there is now provided a metal working machine for cutting metal comprising:
 (a) a machine base having movably mounted thereon,
 (b) a carrier for holding,
 (c) a rotatable, axially movable, cutting tool support bar having a cutting tool receiving surface and a polygon cross-sectional geometry along at least the axially movable length of the bar slidably coupled to,
 (d) a means for rotating the bar about its longitudinal axis comprising a means having a mating polygon geometry slidably engaging the polygon cross-sectional geometry of the bar approximate the place of exit of the tool receiving surface of the bar from the carrier,
 (e) means for moving the carrier and
 (f) means for axially moving the bar.

In one aspect of this invention the means for axially moving the bar, of the metal working machine, further comprises a rotatable, externally splined collar, a stationary member having splined walls defining a receiving socket for mating with and engaging the collar and means to reciprocally move the collar into engagement with and disengagement from the socket. This aspect as is further described in the following disclosure and in the drawings allows the cutting tool support bar to be extended a fixed predetermined distance and held in that extended position for cutting metal.

DETAILED DESCRIPTION OF THE DRAWINGS

Figure 1:
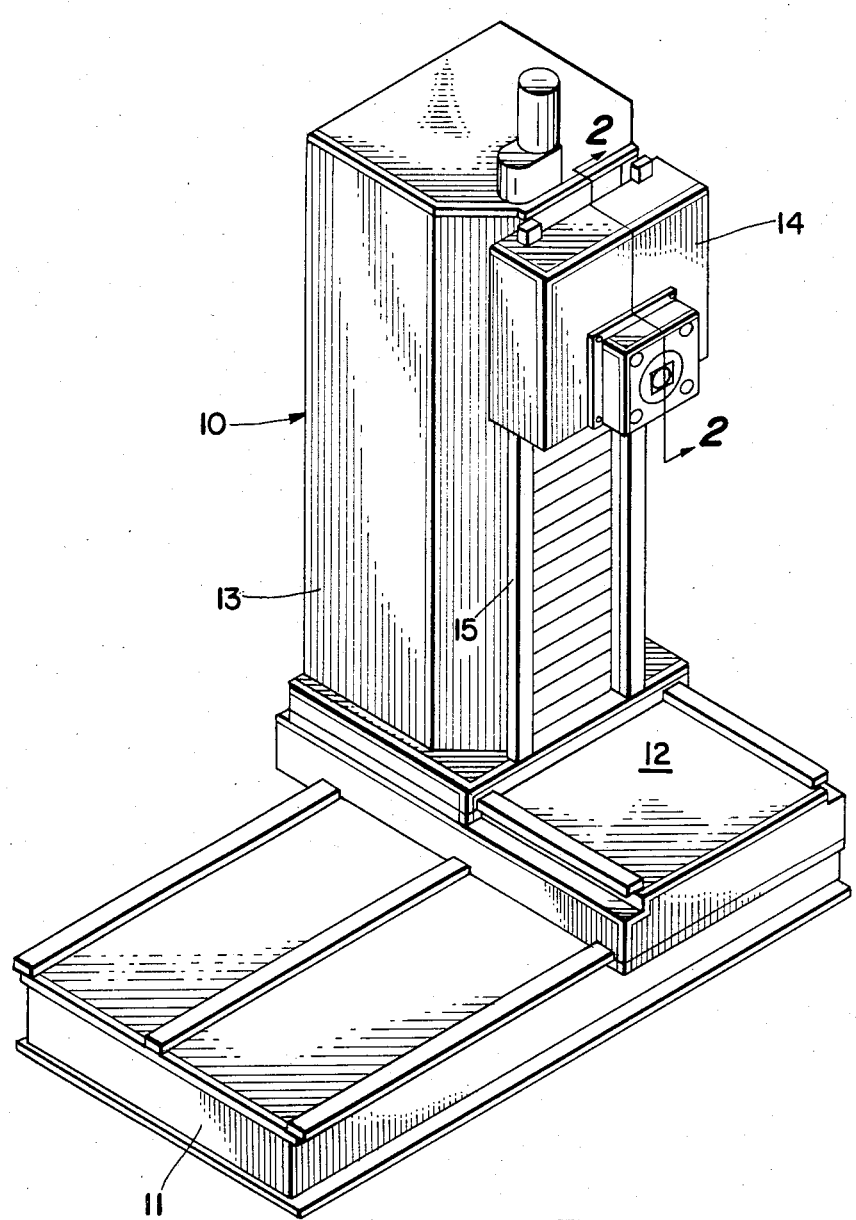
FIG. 1 is an isometric environmental view of a metal working machine in accordance with this invention.

In FIG. 1 there is shown an isometric environmental view of a traveling bifurcated column metal working machine 10 in accordance with one aspect of this invention having a base 11 upon which is slidably mounted cross slide 12 movable along the longitudinal axis of base 11. On cross-slide 12 is located bifurcated column 13 for horizontal movement in a direction along an axis perpendicular to the longitudinal axis of base 11. Attached to column 13 is carrier 14 movable vertically on rails 15 of column 13. The movements of crossslide 12, column 13 and carrier 14 during operation of the machine provide three axis of motion for positioning in space a tool attached to carrier 14.

Figure 2:
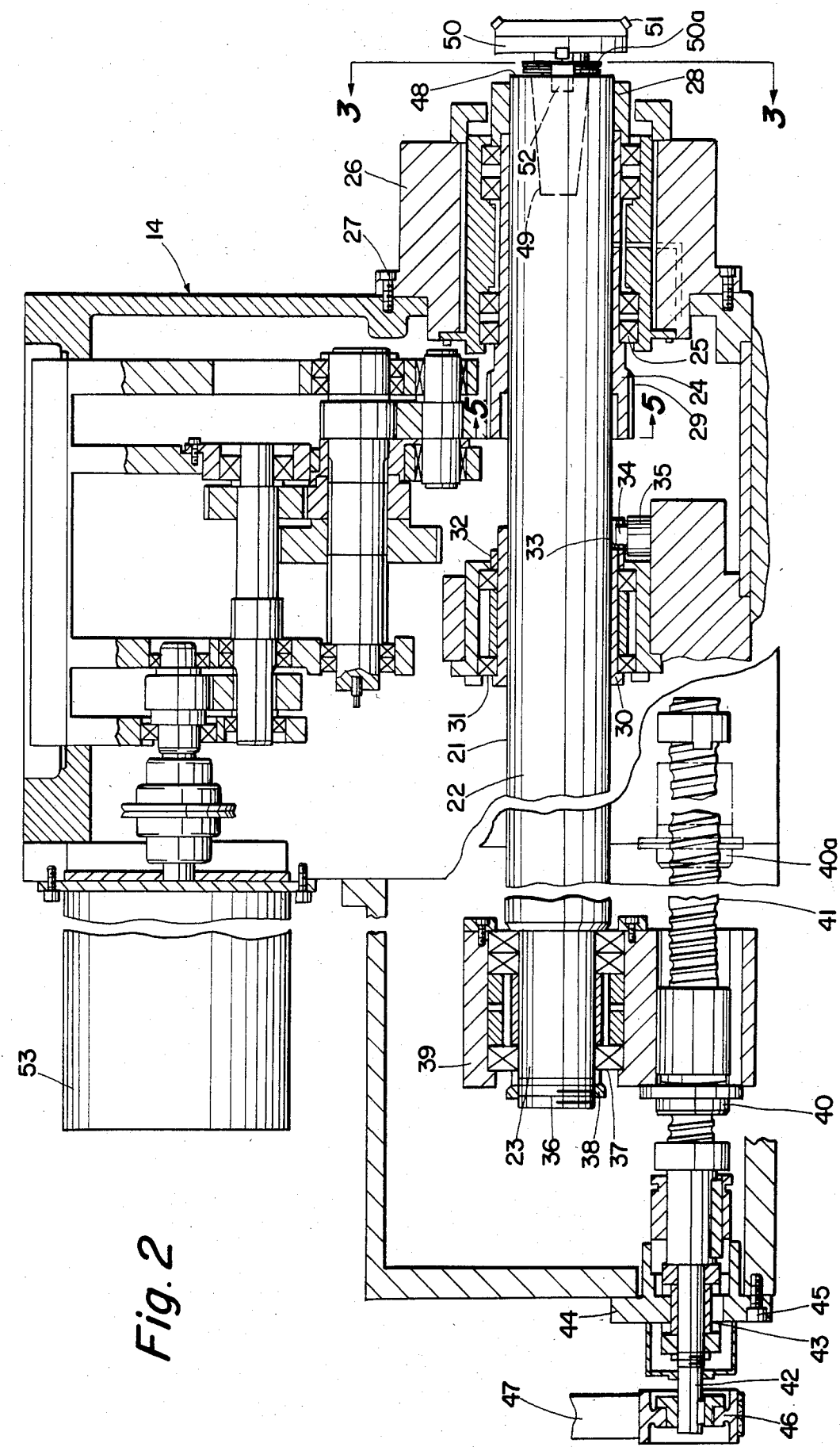
FIG. 2 is a vertical view taken along line 2—2 of FIG. 1 showing in section a tool support bar, a means of rotating the bar and a means of moving the bar axially.

Turning to FIG. 2 there is shown a sectional view taken along line 2—2 of FIG. 1 through carrier 14 to reveal a tool support bar 21, a means for rotating bar 21 and a means for moving bar 21 axially while being engaged by the means for rotating bar 21 in accordance with this invention. In operation tool support bar 21 rotates about its longitudinal axis and is movable axially either during rotation or when at rest. Tool support bar 21 has a polygon cross-sectional geometry portion 22 having a length at least equal to the maximum length of the bar slidably passable through coupling sleeve 24 and a short cylindrical end portion 23 coupled to the means for axially moving tool support bar 21. The polygon cross-sectional geometry portion 22 is slidably engaged by the mating polygon internal geometry of axially stationary coupling sleeve 24 so that the tool support bar slides through coupling sleeve 24 while the bar and the sleeve are rotating so as to extend tool support bar 21 from carrier 14. Forward bearing assembly 25 in end block 26 secured to carrier 14 by bolts 27 supports coupling sleeve 24 housing tool support bar 21 for rotation. Attached to coupling sleeve 24 is collar 28 having the same tool support bar 21 mating polygon internal geometry as coupling sleeve 24. Collar 28 rotates with coupling sleeve 24 and provides the opening through which tool support bar 21 extends from carrier 14. One end of coupling sleeve 24 has gear teeth 29 on its external cylindrical surface to engage the gear drive for rotating the coupling sleeve 24 and hence tool support bar 21. A rotating cylindrical bearing sleeve 30 flanged at one end and threaded at the opposite end for engaging bearing assembly 31 and having an internal polygon geometry to slidably mate with the cross-sectional polygon geometry of tool support bar 21, such that bar 21 slides in bearing sleeve 30, rotatably carries bar 21 in bearing assembly 31 to provide support during the axial and rotational movement of bar 21. Nut 32 threaded on to bearing sleeve 30 secures it to bearing assembly 31. The threaded end of bearing sleeve 30 has a slot 33 to receive pin 34 of fluid cylinder 35, e.g. hydraulic cylinder, to orient tool support bar 21 to receive a tool. To obtain the tool receiving oriented position tool support bar 21 is slowly rotated while fluid cylinder 35 is activated to push pin 34 against the exterior surface of the slot containing end of bearing sleeve 30. When alignment is achieved pin 34 enters slot 33 and rotation of tool support bar 21 ceases in the properly oriented tool receiving position. The cylindrical portion 23 of tool support bar 21 having threaded end 36 is mounted in bearing assembly 37 and held in place by nut 38 threaded onto the end of tool support bar 21 and the shoulder formed between portions 22 and 23 of tool support bar 21. Bearing assembly 37 is attached to yoke 39 which in turn is fixed to ball screw nut 40 on ball screw 41 having an unthreaded stepped cylindrical portion 42 passing through roller bearing 43 mounted in housing 44 held in place by bolts 45 to hold ball screw 41 in position for rotation. The free end of portion 42 of ball screw 41 has attached thereto pulley 46 engaging belt 47 for rotating ball screw 41. Forward face 48 of tool support bar 21 has a tapered socket receiving the mating tapered shank 49 of tool 50 having cutters 51. Tool 50 is held in the socket of tool support bar 21 by a commonly known draw bar, not shown, passing axially through tool support bar 21 and engaging shank 49. Tool 50 is coupled to tool support bar 21 for rotation by a key 52 locked into mating keyways in flange 50a and face 48 of tool support bar 21. Electric motor 53 through a series of gears engaging coupling sleeve 24 rotates coupling sleeve 24, tool support bar 21 and hence tool 50 for performing metal cutting. During the rotation of tool support bar 21 belt 47 may be driven by independent drive means, e.g. electric motor not shown, to turn pulley 46 and hence ball screw 41 attached thereto. As ball screw 41 turns, ball screw nut 40 moves linearly causing yoke 39 fixed thereto to also move in the same fashion and in turn cause tool support bar 21 to move axially. When ball screw 41 is rotated in one direction it produces axial movement of tool support bar 21 to extend tool support bar 21 from carrier 14. Rotation of ball screw 41 in the opposite direction moves tool support bar 21 axially back into carrier 14. The termination of the axial movement of tool support bar 21 at its limits of movement may be accomplished by limit switches, not shown, connected to the drive means for rotating ball screw. In accordance with this invention and with reference to FIG. 2 the tool support bar 21 is preferably driven, i.e. coupled to the tool support bar drive means, proximate to the place where the tool support bar 21 exits carrier 14 for the tool to engage the workpiece. Further, with reference to FIG. 2, the tool support bar, e.g. tool support bar 21, of the metal working machine in accordance with this invention, slidably engages a rotatable coupling, e.g. coupling sleeve 24, having an internal polygon geometry the same or essentially the same as the polygon cross-sectional geometry of the tool support bar. It is essential that the tool support bar have an axially free sliding polygon cross-sectional geometry to obtain sliding, i.e. axial movement, of the tool support bar 21 in the rotational drive coupling (means for rotating) during rotation of the tool support bar. Sharp corners in the polygon cross-sectional geometry of the tool support bar can bind with the rotational drive coupling having a similar internal polygon geometry during the axial movement of the tool support bar under torque load so as to prevent or at least make very difficult the sliding of the bar in the coupling while rotating the bar.

Figure 3:
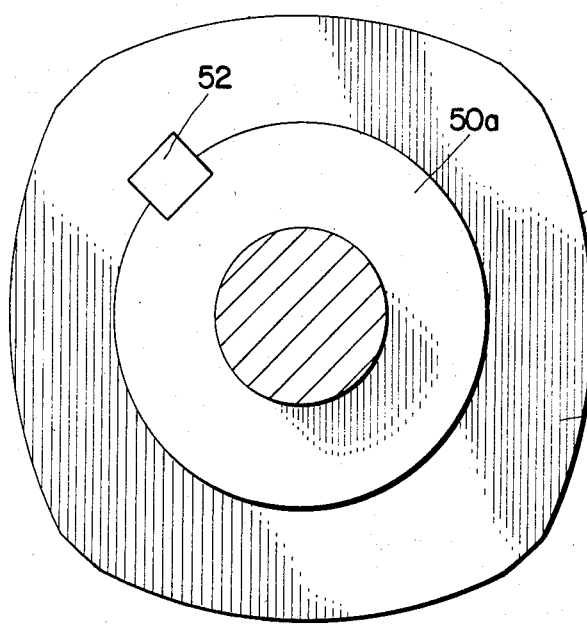
FIG. 3 is a vertical view taken along line 3—3 of FIG. 2 showing a tool receiving surface of the tool support bar.
Figure 4:
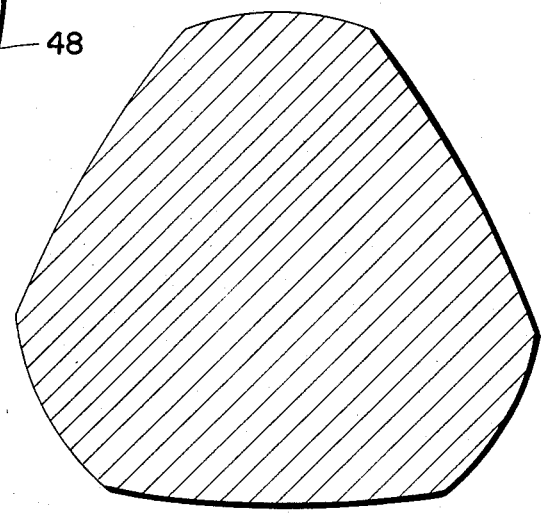
FIG. 4 shows a polygon cross-sectional geometry for the tool support bar.

The end view in FIG. 3, of tool support bar 21 of FIG. 2 taken along line 3—3 of FIG. 2, shows the preferred polygon cross-sectional geometry of polygon portion 22 of tool support bar 21 and the key 52 locking flange 50a of tool 50 to the face 48 of tool support bar 21 for rotation. An alternate polygon cross-sectional geometry for the tool support bar of the metal working machine according to this invention is shown in FIG. 4. The polygon geometry shown in FIG. 4 is known as three lobed polygon.

Figure 5:
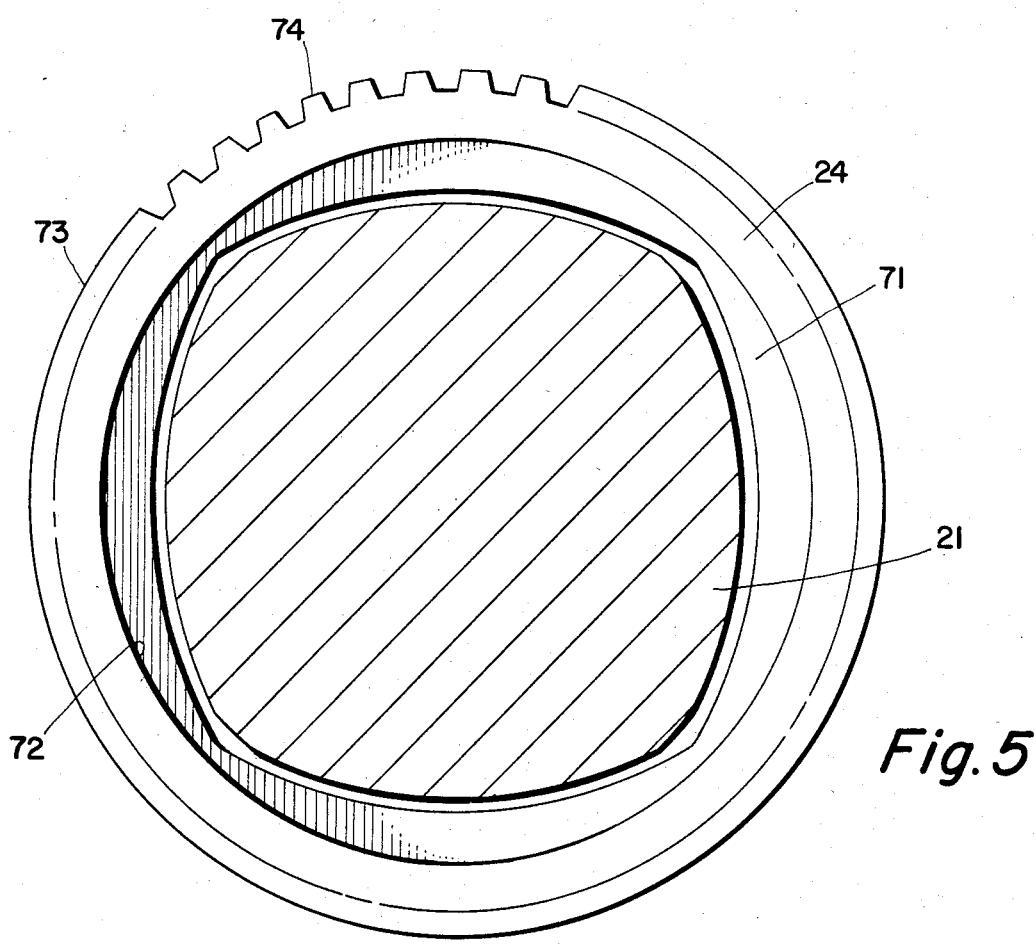
FIG. 5 shows in section a tool support bar in a coupling sleeve for turning the bar.

Now turning to FIG. 5 there is shown a vertical sectional view through tool support bar 21 and an end view of coupling sleeve 24 taken along line 5—5 of FIG. 2. Coupling sleeve 24 has an opening 71 through which bar 21 slides, a wall 72 forming a cylindrical opening larger than bar 21 and gear teeth 74, partially shown, on the entire circumference of outer surface 73. The opening 71 has a polygon geometry substantially the same as the polygon radial cross-sectional geomtry of tool support bar 21 but is very slightly larger than the radial cross-section of bar 21 to allow the sliding of bar 21 through coupling sleeve 24 while rotating bar 21. As coupling sleeve 24 begins to rotate it shifts slightly with respect to bar 21, owing to the opening 71 being very slightly larger than bar 21, so as to engage the outer surface of and rotate bar 21 a self-centering action occurs and bar 21 becomes centered in coupling sleeve 24 for rotation.

Figure 6:
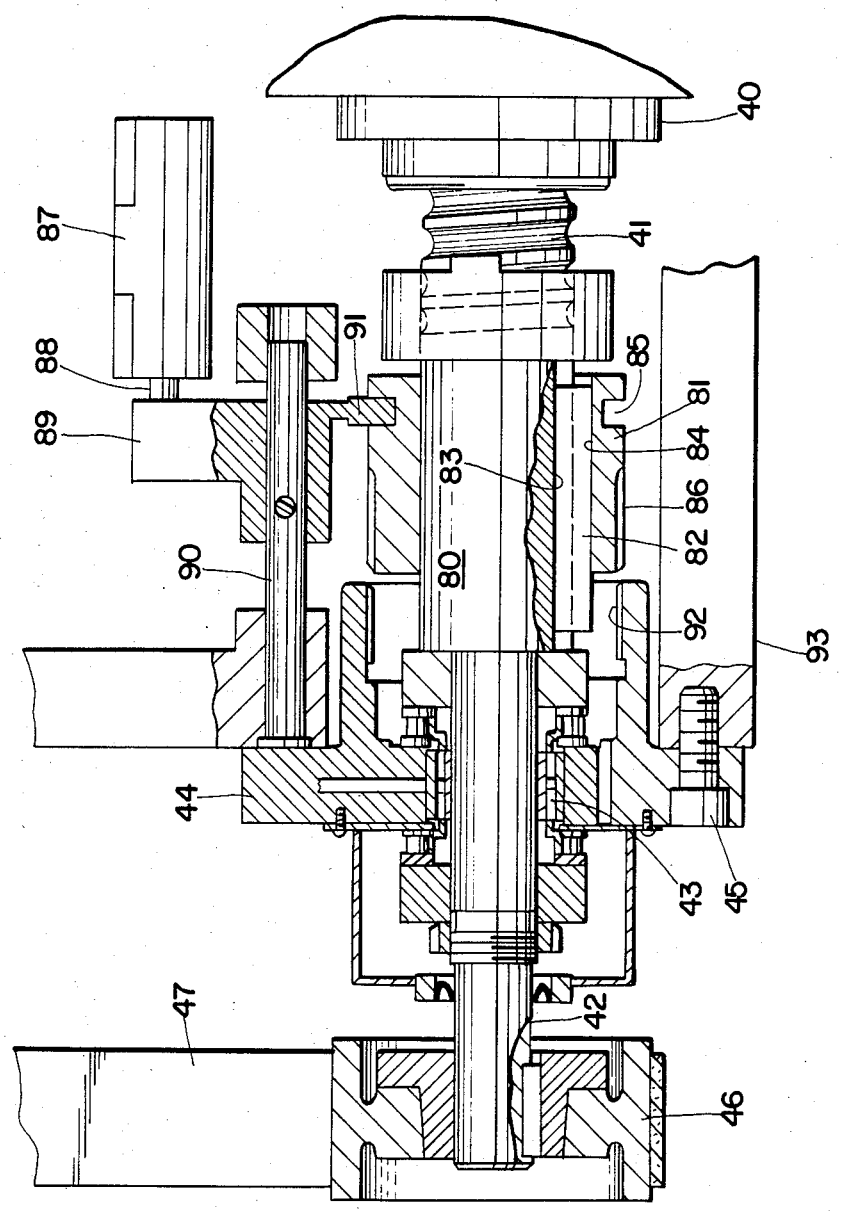
FIG. 6 shows an apparatus for holding the tool support bar in a fixed axial position while rotating the bar.

In one aspect of the practice of this invention the tool support bar may be cantilever extended from the metal working machine in a continuous manner while performing a metal cutting operation. In another aspect of the practice of this invention the tool support bar may be fully extended from the metal working machine as a cantilever beam and then slowly and continuously moved axially back into the machine while performing a metal cutting operation. As a further aspect of the practice of this invention the tool support bar may be extended from the metal working machine a predetermined distance and held in that position while performing a metal cutting operation. To operate in this last aspect using the ball screw drive shown in FIG. 2 for imparting axial movement to tool support bar 21, it is necessary to releasably lock the ball screw 41 so as to prevent it from turning under the force placed on the ball screw nut by the rearward axial thrust of the tool support bar 21. In FIG. 6 is shown an apparatus to releasably lock a ball screw drive means for imparting axial movement to the tool support bar in accordance with the metal working machine of this invention. The operation of ball screw 41, shown in FIG. 6, to axially move the tool support bar in accordance with the metal working machine of this invention has been previously described herein with reference to FIG. 2. Slidably mounted on non-threaded portion 80 of cylindrical shaft section 42 of ball screw 41 is collar 81 attached to portion 80 for rotation by means of key 82 fitting into keyway 83 of shaft portion 80 and keyway 84 of collar 81. Collar 81 has a slot 85 at one end, i.e. the end closest to the threaded section of ball screw 41 and a splined external surface 86 at the other end. Activation of fluid cylinder 87 extends piston rod 88 of cylinder 87 attached to sliding coupler 89 supported on rod 90 and having finger 91 in slot 85 to move collar 81 to engage spline 86 of collar 81 with the internal spine 92 of housing 44 attached to member 93 by bolt 45 so as to lock ball screw 41 to prevent it from rotating. A suitably positioned switch, not shown, would be used to indicate the locked or unlocked condition of collar 81 to prevent the drive, not shown, from moving belt 47 to rotate pully 46 attached to portion 42 of ball screw 41 and thereby turn ball screw 41 when collar 81 is in a locked condition. Collar 81 is shown in the unlocked position in FIG. 6 and in that condition is free to rotate with ball screw 41.

Figure 7:
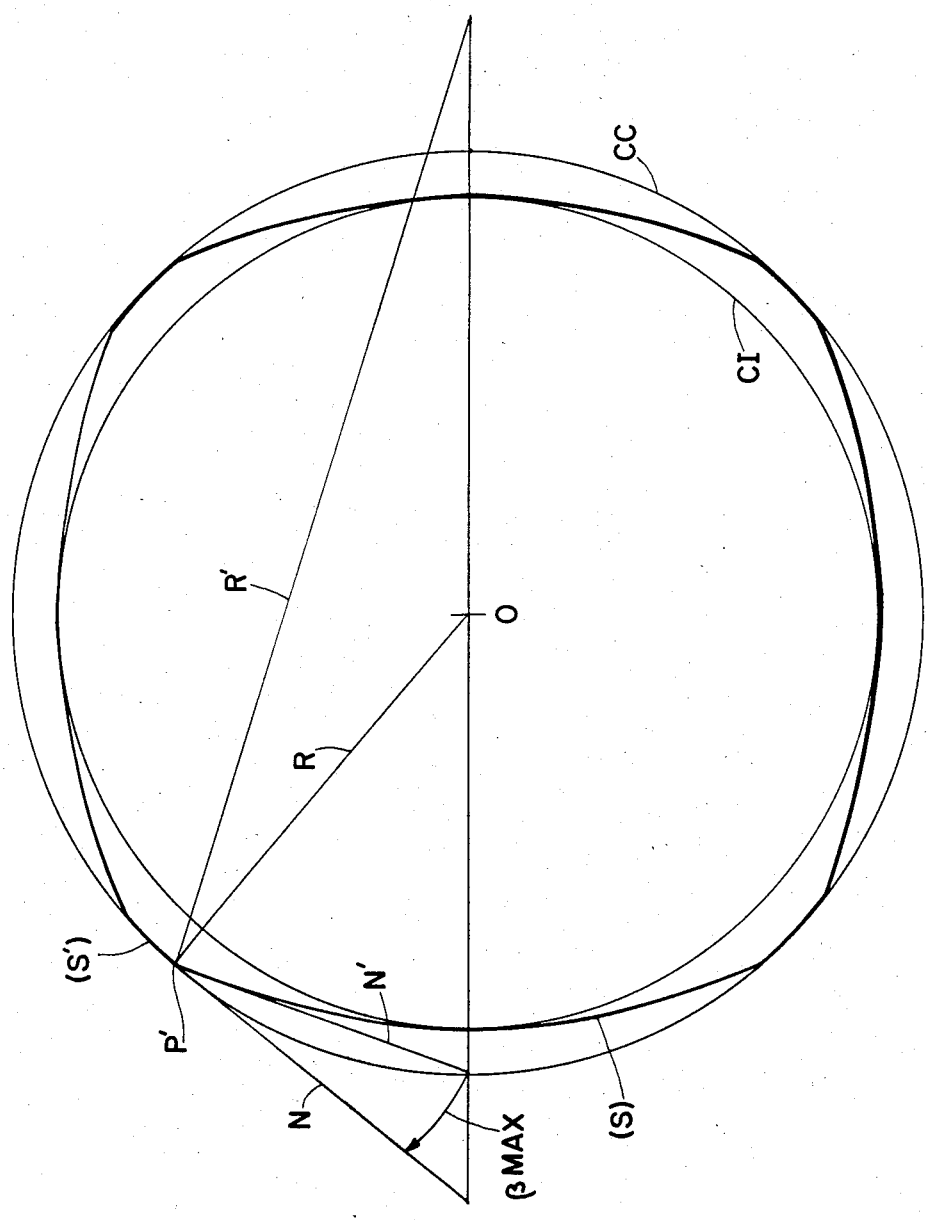
FIG. 7 shows a preferred cross-sectional polygon geometry of the tool support bar and a geometric description of the maximum pressure angle ($\beta$ max).

The preferred polygon cross-sectional geometry for the tool support bar of the metal working machine in accordance with this invention is shown in FIG. 7. This polygon cross-sectional geometry exists at least over that portion of the tool support bar that slidably engages the drive means for rotating the bar while the bar is cantilever extended from the metal working machine. In this invention it is essential that the tool support bar slidably engages the drive means for rotating the bar and that such sliding engagement be operative while torque forces are applied to the bar. The polygon geometry shown in FIG. 7 is characterized by having a center (O) which is the center for an inscribed circle (CI) and a cropped circle (CC), four curved identical major curved segments (S), and four curved identical motor curved segments (S'). The major curved segments (S) can have a varying radius of curvature and in the polygon geometry of FIG. 7 are generated from at least one point outside the perimeter of the polygon geometry while the minor curved segments (S') are generated from the center (O) of the polygon geometry. Major curved segments (S) are symmetrically spaced about center (O) and are connected together in pairs (i.e. an alternating pattern of major and minor segments) by minor curved segments (S'). Thus, the polygon geometry shown in FIG. 7 is symmetrical and has a center symmetry and several axis of symmetry.

For purposes of transmission of a torque force during the rotation of the tool support bar of this invention the perimeter of the polygon has identified with it a varying pressure angle ($\beta$) for contact with the drive means collar to transmit the torque force. The value of the pressure angle ($\beta$) increases from a value of zero to a maximum value and again decreases as the angle is determined going along the major curved segment of the polygon from the mid point of the segment to the intersection of the segment with another (i.e. minor) segment of the polygon. The maximum value of the pressure angle is dependent upon the polygon geometry, the difference in the diameters for the inscribed and circumscribed circles of the polygon and the dimensions of the polygon. In the preferred geometry of the polygon cross section of the tool support bar in the practice of this invention, as shown in FIG. 7, the maximum value of the pressure angle occurs at the intersection (point P') of the major curved segment (S) and the minor curved segment (S') by the selection of the polygon dimensions, particularly the diameter of the inscribed circle (CI) of the polygon and the diameter of the crop circle (CC) of the polygon.

Referring to FIG. 7 again, geometrically the pressure angle $\beta$ is defined by (1) locating a point (P') on major curved segment (S), (2) constructing the radius (R') of curvature to that point, (3) at point (P') constructing a normal (N') to radius (R'), (4) drawing a line (R) from the center of the polygon to point (P') on major arc segment (S) and (5) constructing a line (N) normal to the line (R) at point (P'). The angle formed by lines (N) and (N') at point P' is the pressure angle β. As point P' moves along major curved segment (S) away from the mid point of the curved segment the pressure angle β increases and in the geometry of the bar of FIG. 7, in the practice of this invention, reaches a maximum value (β max) at the point of intersection between major (i.e. longer) curved segment (S) and minor (i.e. shorter) curved segment (S'). For the polygon geometry shown in FIG. 7, known as a cropped P-4 (i.e. four lobed) geometry, there are 8 points where the maximum value of the pressure angle is achieved. The pressure angle (β) may be calculated in accordance with the following formulae.

$$\beta = \tan^{-1} \frac{ne \sin n\alpha}{\frac{Di}{2} + e - e \cos n\alpha}$$

where
n = number of lobes on the polygon geometry
e = Da − Di/4
Da = diameter of the circumscribed circle about the polygon
Di = diameter of the inscribed circle in the polygon
α* is given by $$\alpha^* = \left[ \frac{\cos^{-1} \frac{e}{\frac{Di}{2} + e}}{4} \right]$$

α* is α at β max

To obtain the cropped geometry of FIG. 7 the original uncropped geometry, which is the same geometry as shown in FIG. 7 except that the curved segments S extend to interesect each other and form four corners, is modified by grinding off the four corners to produce the geometry of FIG. 7 having a circumscribed circle whose radius, from the center of the polygon, is given by the following formula.

$$R = \left( \frac{Di}{2} + e - e \cos n\alpha^* \right)^2 + (ne \sin n\alpha^*)^2$$

where Di, e and n are as defined above and α* is given by the above formula. To put it another way the uncropped geometry as described above is circularly ground to remove the corners until the diameter across the opposite minor curved segments (S') of the geometry is twice the value of R given by the above formula.

FIG. 7 serves as the basis for introducing the formulae to calculate the maximum value of the pressure angle β for the geometry shown and the radius for the cropping circle to produce the cropped polygon geometry. The polygon geometry shown in FIG. 7 has 4 lobes or corners and is obtained from a P-4 polygon geometry produced on a Fortuna grinder models AFD and UFD manufactured by the Fortuna-Werke Spezialmaschinenfabrik AG, Stuttgart-Bad. Cannstatt, West Germany. This grinder produces polygon geometries by grinding a rotating workpiece with a rotating grinding wheel whose center is moved in an elliptical path such that the grinding point always remains normal to the work surface and the line from the center of the grinding wheel to the point of contact of the wheel with the workpiece is always parallel to the line between the center of the workpiece and the center of the elliptical path traced by the center of the grinding wheel.

Figure 8:
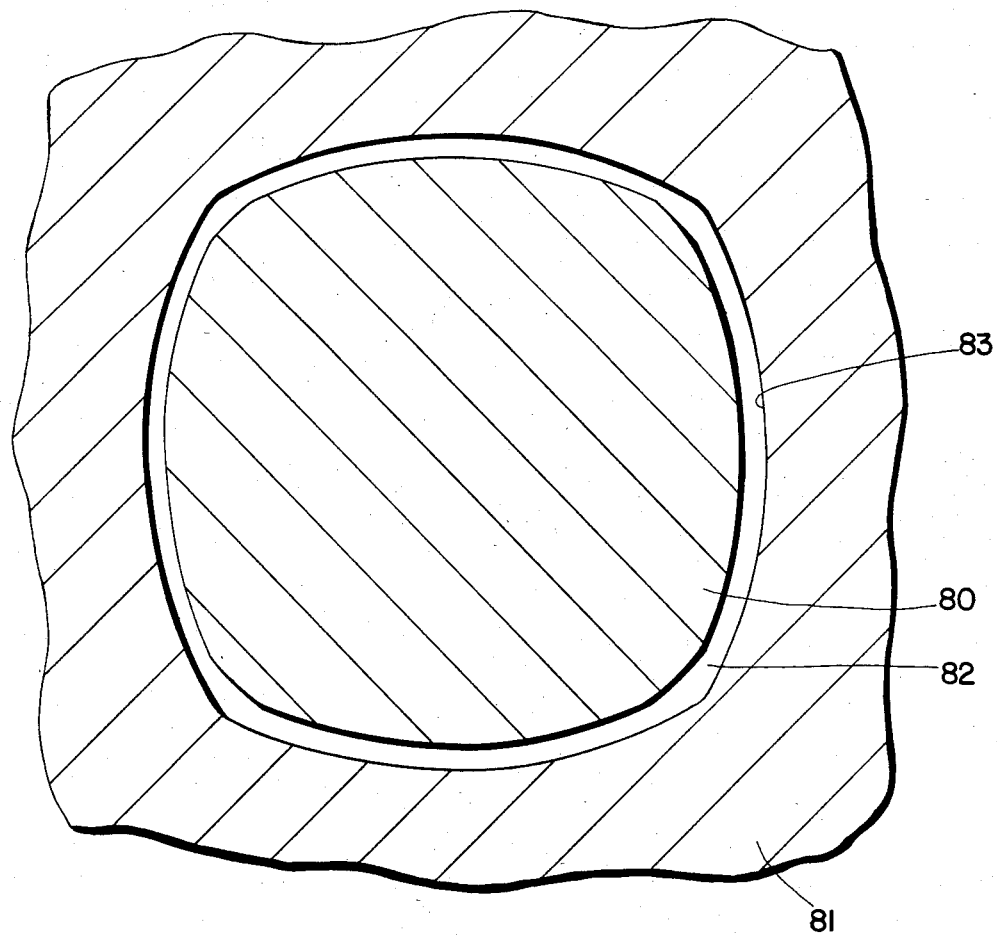
FIG. 8 shows in section the tool support bar and the opening of the coupling sleeve for turning the bar in a static no load condition with the bar in the center of the opening.

Referring now to FIG. 8 there is shown, for illustrative purposes, in section the polygon geometry of tool support bar (80) centrally positioned in collar 81 to demonstrate that the opening in the collar to slidably receive the tool support bar has a geometry substantially like the geometry of the cross section of the tool support bar. The space 82 between bar 80 and collar 81 is exaggerated in the figure and normally is only sufficient to permit sliding of bar 80 in collar 81 in a no torque load condition.

In accordance with this invention the polygon tool support bar 80 is rotated by the collar 81 having an opening with a polygon geometry to mate with the polygon geometry of the tool support bar and permit axial sliding of the bar in the collar. The collar 81 is engaged and rotated by the drive means (not shown) and in turn rotates the tool support bar 80. Thus, the collar is part of the drive means for rotating the tool support bar. For obtaining axial sliding of the tool support bar 80 in the collar 81, the opening 83, having a polygon geometry to mate with the tool support bar 80 cross-sectional polygon geometry, is only just enough larger than the bar to permit axial sliding of the bar in the collar under static no torque load conditions. However, when a torque is applied to the bar by the collar a very slight radial shift occurs between the bar and the collar. This shift advantageously produces a self-centering action on the bar in the collar while under torque load.

In the practice of this invention to achieve axial sliding of the polygon cross-section tool support bar in the drive means collar, having an opening with a mating polygon geometry to receive the tool support bar, under torque load the pressure angle (β) on the polygon cross-section tool support bar at the point of contact between the bar and the collar must have a tangent value greater than the coefficient of friction between the bar and the collar. Should contact between the polygon cross section geometry of the bar and the collar occur, under torque load, at a pressure angle whose tangent value is less than the coefficient of friction between the collar and the bar seizing occurs during axial sliding of the bar in the collar and axial sliding of the bar in the collar while under torque load is extremely difficult or nearly impossible. Thus, the pressure angle (β) on the polygon geometry of the bar at the point of contact between the bar and the collar under torque load is important in defining the polygon cross sectional geometry of the bar and the sliding (i.e. axial movement) of the bar in the collar. The mating polygon geometry of the opening in the collar for axial sliding of the bar in the collar usually is substantially the uncropped polygon cross section geometry of the tool support bar in the practice of this invention.

As used herein and in the appended claims the term polygon denotes a planar geometric shape having a center and a closed perimeter comprising a plurality of symmetrically spaced, identical, curved segments at least one of which has at least one radius of curvature that extends to the segment from a point of origin spaced from the center and the curved segments joining to form a plurality of symmetrically spaced lobes (i.e. points of maximum distance from the center of the polygon). The term cropped as used herein and in the appended claims means the reduced extension of the lobes of the polygon from the center of the polygon over the extension of the lobes of the uncropped polygon, see FIG. 8 and the above discussion of FIG. 8 as illustrative. Cropping as used herein and in the appended claims means the step of reducing the extension of the lobe of the polygon measured from the center of the polygon.

What is claimed is:

1. A machine tool, comprising:
 a machine base;
 a carrier movably supported on said base;
 a cutting tool support bar journalled in said carrier for rotation about a longitudinal bar axis, said support bar being axially slidable during rotation thereof, and said support bar having
  a cutting tool-receiving first surface and
  a second surface of polygon cross-sectional geometry formed around said longitudial bar axis;
 drive means for rotating said bar, said drive means comprising, in part, means cooperatingly formed to, and matingly engaged with, said second surface of said bar, said drive means located proximal to a carrier face defining a point of exit of said bar with respect to said carrier, and
 means for axially moving said bar with respect to said drive means and said carrier;
 wherein said polygon cross-sectional-geometry of said second surface comprises
  a center, coincident with said longitudinal bar axis;
  a closed perimeter formed, in part, by a plurality of symmetrically spaced, identical, curved segments, at least one of said segments having a radius-of-curvature extending to the segment from a point of origin spaced from said center; and
  a pressure angle at the point of contact of said second surface with said drive means during rotation, said pressure angle having a tangent value greater than the coefficient of friction between said second surface of said cutting tool support bar and said drive means.

2. The machine tool according to claim 1, further comprising means for releasably holding said support bar in a prescribed axial position during rotation of said bar about said longitudinal axis.

3. A machine tool according to claim 2, wherein said plurality of curved segments comprises four.

4. A machine tool according to claim 1, wherein said plurality of curved segments comprises three.

5. A machine tool according to claim 1 wherein said drive means includes a collar means slidably engaging said bar through a central opening having a polygon geometry cooperatingly mating with said second surface of said bar.

* * * * *